US006806476B2

(12) United States Patent
Rose et al.

(10) Patent No.: US 6,806,476 B2
(45) Date of Patent: Oct. 19, 2004

(54) IRRADIATION FACILITY CONTROL SYSTEM

(75) Inventors: Graham Rose, Ottawa (CA); Frank Joseph Groe, Lake Havasu City, AZ (US)

(73) Assignee: Ion Beam Applications, S.A., Louvain-La-Neuve (BE)

( * ) Notice: Subject to any disclaimer, the term of this patent is extended or adjusted under 35 U.S.C. 154(b) by 0 days.

(21) Appl. No.: 10/151,029

(22) Filed: May 21, 2002

(65) Prior Publication Data

US 2003/0218142 A1 Nov. 27, 2003

(51) Int. Cl.[7] ............................................... H01J 37/20
(52) U.S. Cl. .............................. 250/455.11; 250/492.1; 250/453.11; 250/454.11
(58) Field of Search ........................ 250/453.11, 454.11, 250/455.11, 492.1, 492.3

(56) References Cited

U.S. PATENT DOCUMENTS

| | | | |
|---|---|---|---|
| 3,564,241 A | 2/1971 | Ludwig | 250/52 |
| 4,446,374 A | 5/1984 | Ivanov et al. | 250/492.3 |
| 5,400,382 A | 3/1995 | Welt et al. | 378/69 |
| 5,583,412 A * | 12/1996 | Nielsen | 318/811 |
| 5,941,305 A | 8/1999 | Thrasher et al. | |
| 6,006,536 A | 12/1999 | Ochs | 62/378 |
| 6,215,847 B1 | 4/2001 | Perrins et al. | 378/69 |
| 6,459,089 B1 | 10/2002 | Masefield et al. | 250/453.11 |
| 2001/0042841 A1 | 11/2001 | Lyons et al. | 250/492.3 |
| 2003/0094581 A1 * | 5/2003 | Rose | 250/492.1 |

FOREIGN PATENT DOCUMENTS

| | | |
|---|---|---|
| EP | 0 633 466 A1 | 1/1995 |
| EP | 1 115 121 | 7/2001 |
| EP | 1 115 121 A1 | 7/2001 |
| WO | 98 19740 | 5/1998 |
| WO | WO 98/19740 | 5/1998 |
| WO | WO 99/67793 | 12/1999 |
| WO | WO 00/68955 | 11/2000 |
| WO | WO 01/25754 | 4/2001 |

OTHER PUBLICATIONS

Patent Abstracts of Japan, 1998, No. 11, & JP 10 160899 A (Nissin High Voltage Co Ltd), 1998.
Patent Abstract of Japan, 1998, No. 11, & JP 10 160899 A(Nissinhigh Voltage Co. Ltd), 1998.

* cited by examiner

*Primary Examiner*—John R. Lee
*Assistant Examiner*—Erin-Michael Gill
(74) *Attorney, Agent, or Firm*—Dorsey & Whitney LLP

(57) ABSTRACT

The instant invention is directed to an article irradiation facility that comprises, within a cell, an accelerator for generating a radiation beam and a beam pass conveyor. In order to better control the dose delivered to articles treated at the facility, the current of the radiation beam is slaved to the speed of the beam pass conveyor. The actual (versus requested) speed of the beam pass conveyor is continuously monitored using a variable frequency drive. The drive infers the speed of the beam pass conveyor from changes in the induction, resistance, flux current and/or inertia off the motor for the beam pass conveyor. The drive is positioned outside the cell and eliminates the need for speed sensors within the cell that are susceptible to radiation damage.

18 Claims, 3 Drawing Sheets

IRRADIATION FACILITY CONTROL SYSTEM

TECHNICAL FIELD

The instant invention is directed to an irradiation facility. More specifically, the instant invention is directed to an irradiation facility that slaves accelerator beam current to beam pass conveyor speed. The beam pass conveyor speed is controlled and monitored using a variable frequency drive that is located outside the irradiation cell and does not require speed sensors within the cell.

DEFINITIONS

For the purposes of this application, "treating product" refers to product sterilization, pasteurization, and/or chemical modification.

For the purposes of this application, an "irradiation facility" is a facility that treats product using one or more types of radiation. The most common forms of radiation used to treat product are x-rays, electron beam (e-beam), gamma radiation, and microwave radiation.

For the purposes of this application, a radiation beam is a focused or directed ray of radiation (e.g., an e-beam) or secondary radiation generated from the same (e.g., x-rays generated by aiming an e-beam at a metal target).

For the purposes of this application, an "accelerator system" or "beam source" is a device used generate and direct a radiation beam.

For the purposes of this application, a "beam pass conveyor" as a conveyor that transports product through a radiation beam.

For the purposes of this application, a "radiation shielding" is a barrier, or series of barriers, designed to contain radiation emitted by an accelerator system or beam source within a defined area.

For the purposes of this application, a "radiation cell" is the area of an irradiation facility within the radiation shielding.

BACKGROUND

The use of irradiation to sterilize articles, especially medical devices, is known in the art. Ethicon, a Johnson & Johnson Company, located in Somerville, N.J., used e-beams to sterilize medical devices as early as 1956. Furthermore, in 1960, gamma sterilization (using a cobalt-60 source) was used to sterilize medical products at Wantage in the United Kingdom and to inactivate bacillus anthrasis in goat hair in Australia.

Irradiation is now used to sterilize food. One of the earliest irradiation facilities created for this purpose is operated by the Florida Department of Agriculture in Gainesville, Fla. This facility, among other things, uses an e-beam or an x-ray beam to treat products such as blueberries. This facility began operation in the early 1990's.

Other common uses for irradiation include the chemical modification of polytetrafluoroethylene (PTFE) and silicon wafers. In addition, the use of irradiation to sterilize mail is one of the "Homeland Security" initiatives of the United States government in response to the terrorist attacks of Sep. 11, 2001 and the concurrent spread of anthrax through the mail.

In all irradiation applications, carefully and continuously controlling the dose delivered to product is critical. If a product receives too little radiation, the desired sterilization, pasteurization, and/or chemical modification is not obtained. If a product receives too much radiation, the treatment is, at the very least, inefficient and, at the very worst, damaging to the product. Accordingly, numerous protocols and standards outline the proper procedure for controlling dose. Illustrative standards include: (1) the American Society for Testing and Materials (ASTM) Standard Designation E 1431-91, entitled "Practice for Dosimetry in Electron and Bremsstrahlung Irradiation Facilities for Food Processing" (1991); and (2) the Association for the Advancement of Medical Instrumentation/American National Standard/US Department of Defense combined standard entitled "Guideline for Electron Beam Radiation Sterilization of Medical Devices" (1991). A general overview of various standards in the art is included in an article entitled Electron Beam Sterilization," written by Marshall R. Cleland and Jeffrey A. Beck and contained in the *Encyclopedia of Pharmaceutical Technology*, vol. 5, edited by James Swarbrick and James C. Boylan, and published by Marcel Dekker, Inc., New York, N.Y., in 1992. All of these standards, either specifically or generally, express the need to carefully control the critical parameters that affect dose. Critical parameters include, among other things, the selected electron energy spectrum (which affects the depth dose distribution), the average beam current (affects dose rate), the beam pass conveyor speed (affects exposure time), and the beam dispersion parameters, such as beam width.

The beam current and conveyor speed are two of the most important parameters that are monitored, controlled, and coordinated to insure proper dosing. For facilities utilizing continuously-moving conveyors to transport product through an irradiation zone, conveyor speed and beam current control the absorbed dose in the product. If the beam current rises, the dose received by a product passing through the beam increases. If conveyor speed drops, the exposure time and, therefore, dose received, increases. Both actions, therefore, directly impact total dose and must be coordinated.

Traditionally, conveyor speed and beam current have been controlled by a programmable logic controller ("PLC") that slaves mechanisms controlling beam pass conveyor speed to mechanisms controlling accelerator beam current. In other words, any changes in beam current are compensated for by sufficient changes in conveyor speed to insure the desired dosing of product. If the beam current rises unexpectedly (thereby increasing dose), the conveyor speed also rises (thereby decreasing dose), and visa versa, in an amount determined by a pre-set calculation. To date, the mechanisms controlling beam current have always been the master because commercially available accelerators could not respond swiftly enough to conveyor speed changes. For example, a conventional Dynamitron accelerator requires 10 to 20 seconds to change the requested current and a conventional Linac requires from 10 to less than 0.1 seconds depending on the design of the gun and control system to change the requested beam current. In comparison, traditional motors require approximately 0.25 to 0.5 seconds to change the requested conveyor speed.

It would be desirable to create a more responsive system for coordinating conveyor speed and beam current in an irradiation facility. A more responsive system would insure more control and uniformity in dosing.

Traditionally, the actual speed of the beam pass conveyor is measured using a sensor that is physically located near the conveyor within the cell of the irradiation facility. Such devices include tachometers, encoders, and resolvers, and limit switches.

For example, Titan Corporation describes an irradiation facility in U.S. Pat. No. 5,396,074 ("the '074 patent"). In the '074 patent, a controller sends a selected speed to a servo motor that drives a beam pass conveyor (called a "process conveyor" in the '074 patent). The actual speed of the beam pass conveyor motor is monitored using an encoder. The controller uses a proportional integrated differential (PID) loop to reduce the difference between the selected motor speed and the actual motor speed. The '074 patent also discusses another system for measuring speed wherein the articles on the conveyor contact limit switches that are feed back to the controller.

These speed measuring devices are expensive. For example, an encoder costs around $2,000.00. Furthermore, because these devices are positioned within the radiation cell and involve a number of parts that are susceptible to radiation damage, the devices have to be carefully monitored for accuracy and the part have to be periodically replaced.

It would be desirable to reduce the number of parts susceptible to radiation damage within the radiation cell of an irradiation facility. This would lower operating costs by reducing the frequency of part replacement.

SUMMARY OF THE INVENTION

The instant invention is directed to an irradiation facility wherein the current of a radiation beam is adjusted according to fluctuations in the speed of a beam pass conveyor. This is opposite to the traditional master/slave relationship used in the industry. It is made possible by the introduction of more responsive accelerators that are capable of changing beam current in under 0.1 seconds. When using such accelerators, reversing the traditional master/slave relationship actually speeds up the coordination between beam pass conveyor speed and accelerator current and, thereby, enhances dose control.

The instant invention is also directed to an irradiation facility that measures the speed of the beam pass conveyor without requiring mechanical speed sensors located inside the radiation cell. This is made possible by the introduction of drives that infer motor speed from a distance from changes in induction, resistance, flux current, and/or inertia of a motor. These devices can be positioned outside the radiation cell (i.e., substantially away from the motor on the beam pass conveyor) without hampering their ability to control and monitor the actual speed of the motor. By eliminating more traditional speed measuring sensors that must be positioned proximate to the motor (e.g., encoders resolvers, tachometers, and limits switches) the number of parts within the radiation cell is reduced. Therefore, the number of parts susceptible to radiation damage and the resultant maintenance time and operating costs are minimized.

DETAILED DESCRIPTION

In irradiation facilities that treat product with radiation beams (e.g., e-beams and x-ray beams) conveyors convey the product through the beam. The beam may originate under, over, or adjacent to the product, but is generally positioned perpendicular to the flow of the product passing through the beam.

Figure 1:
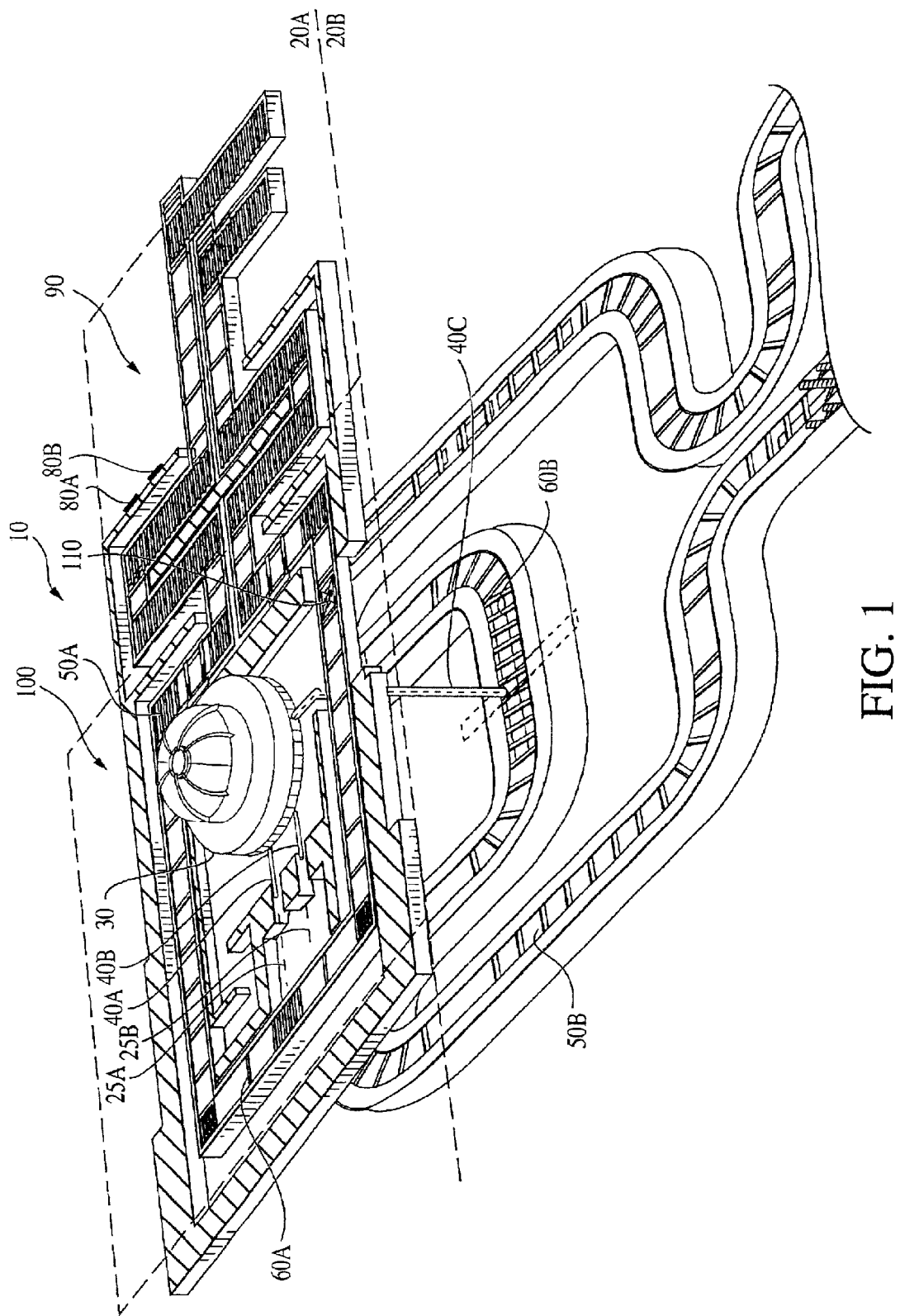
FIG. 1 is an illustrative irradiation facility.

FIG. 1 illustrates an exemplary irradiation facility 10. The irradiation facility 10 is the subject matter of U.S. patent application Ser. No. 09/987,966 entitled "Article Irradiation System with Multiple Beam Paths," the entirety of which is herein incorporated by reference.

In FIG. 1, irradiation facility 10 contains two levels, namely, an upper level 20A and a lower level 20B. A radiation source 30, in this case a Rhodotron TT300 accelerator (available from IBA, s.a.), contains three radiation beam paths, 40A, 40B and 40C.

Radiation beam paths 40A and 40B are located on upper level 20A of irradiation facility 10 and project 5 Mev and 7 MeV x-ray beams 25A and 25B, respectively. A conveyor system 50A contains a beam pass conveyor 60A that conveys product contained in totes (not shown) through either x-ray beam 25A or 25B. Beam paths 40A and 40B are positioned adjacent and perpendicular to the direction 70A that totes (not shown) travel on beam pass conveyor 60A.

Radiation beam path 40C is located on lower level 20B of irradiation facility 10 and projects a 10 MeV e-beam (not shown). A magnet (not shown) is used to direct the e-beam (not shown) downward through radiation beam guide 40C. A lower level conveyor system 50B contains a beam pass conveyor 60B that conveys product contained in totes (not shown) through the electron beam (not shown) that projects from radiation beam path 40C. Beam path 40C is positioned over, and substantially parallel to, the direction 70B that totes (not shown) travel on beam pass conveyor 60B.

Impact drives 80A and 80B are used to control and monitor the motors (not shown) of beam pass conveyor 60A and 60B, respectively. These impact drives (80A, 80B) are located in an operation control area 90 located outside a radiation cell 100. There are no encoders, resolvers or tachometers inside the radiation cell 100.

Generally, an active or passive rotation device 110 are located at some point after the beam pass conveyor (60A or 60B) to permit the radiation of totes (not shown) from opposite sides. Totes (not shown) are rotated by the rotation device 110 and rerouted by the conveyor system (50A or 50B) for a second pass on the beam pass conveyor (60A or 60B) through the radiation beam. This "double sided irradiation" is often necessary to insure uniform dosing of product that is particularly dense or bulky and, therefore, less uniformly penetrated by the radiation beam.

Figure 2:
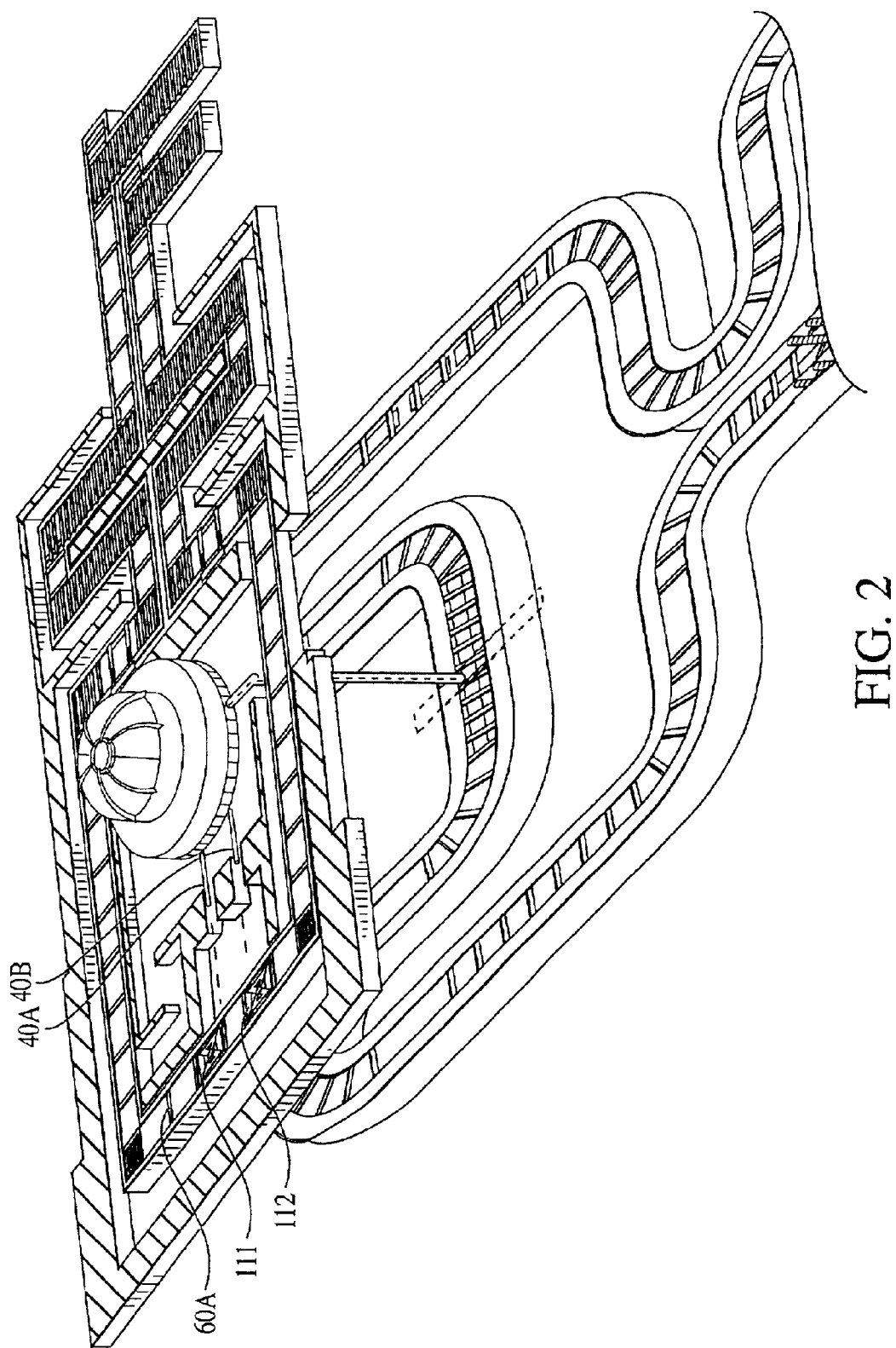
FIG. 2 is a network layout for logic control for an irradiation facility such as that illustrated in FIG. 1.

FIG. 2 shows another illustrative irradiation facility. FIG. 2 is substantially analogous to FIG. 1 with the exception that the rotation devices 111 and 112 are located proximate to the beam pass conveyor 60A so that articles can be irradiated immediately in front of the radiation beam. This is a novel setup that permits totes (not shown) to be rotated within the radiation beam paths (40A and 40B). This in-situ rotation requires strong coordination between beam current, beam pass conveyor speed, and product rotation speed. While the arrangement makes dose control more complex, it eliminates the number of passes that are necessary for double sided irradiation. Therefore, for certain applications, where double sided irradiation is the norm, this arrangement may be preferred.

The accelerator used in the invention must be capable of executing current changes in a manner generally faster than conventional conveyor motors, i.e. faster than 0.1 seconds. The IBA Rhodotron family of accelerators has this capability. Other accelerator models, such as the Dynamitron and Linac accelerators, are not currently responsive enough to be acceptable. Conventional Dynamitron accelerators require 10 to 20 seconds to change the requested beam current. Conventional Linac accelerators require from 10 to less than 0.1 seconds, depending on the design of the gun and control system, to change the requested beam current.

The Rhodotron family of accelerators are described in U.S. Pat. No. 5,107,221, the entirety of which is incorporated herein by reference. IBA sells three types of Rhodotron accelerators, namely, the TT100, TT200 and TT300 models. All three models work equally well in the invention as the principle difference between the models is total power output and not responsiveness.

By using this new generation of rapidly responsive accelerators as a slave to the mechanisms that control beam pass conveyor speed, faster coordination between conveyor speed and beam current is obtained. This, in turn, permits better control over the dosing received by the product being treated.

The speed of the motor of the beam pass conveyor is continually monitored and controlled using a variable frequency drive that is capable of inferring conveyor speed from slight changes in induction, resistance, flux current, and/or inertia of the conveyor motor. In about 1994, Allen-Bradley and other manufacturers introduced variable frequency drives that allow one to accurately control the speed of a motor without physically positioning a sensor next to the motor. For example, the Allen-Bradley 1136 Impact Adjustable Frequency AC Drive performs this function. This drive is sold by, among others, Rockwell Automation.

The variable frequency drive is installed outside the cell. With proper tuning of the drive, slight changes in induction, resistance, flux current and inertia off the motor can be monitored from a great distance (i.e., from 150 feet or more). In other words, the drive infers speed from electrical noise off the motor previously considered to be useless information. Accordingly, there is no longer a need for mechanical devices mounted on the motor to measure speed. Preferably, speed sensors, such as encoders, resolvers, tachometers, limit switches, etc . . . are not present.

Eliminating speed sensors positioned next to the motor reduces the number of components within the cell that are susceptible to radiation damage. This, in turn, reduces operating costs by eliminating the need to monitor for sensor degradation and periodically replace sensors or parts therein.

Before variable frequency drives can be used to monitor a motor, they must be tuned so that changes in induction, resistance, flux current and inertia can be related to the speed of the motor and, therefore, the conveyor. The tuning process is adequately detailed in user manuals sold with the conveyors. The April, 2000 User Manual for the Allen-Bradley 1336 Impact Adjustable Frequency AC Drive is publicly available at their website http://www.ab.com/drives/1336impact/literature/index.html, and herein incorporated by reference. Tuning will differ slightly with every setup, due to changes in the type of motor used, distance of the drive from the motor, etc. . . . Preferably, during tuning, the speed of the motor is correlated to a 0 to 4096 digital signal.

Preferably, the variable frequency drives are used with motors that have at least a 1600 volt insulation. Such motors are fairly standard in the industry.

Figure 3:
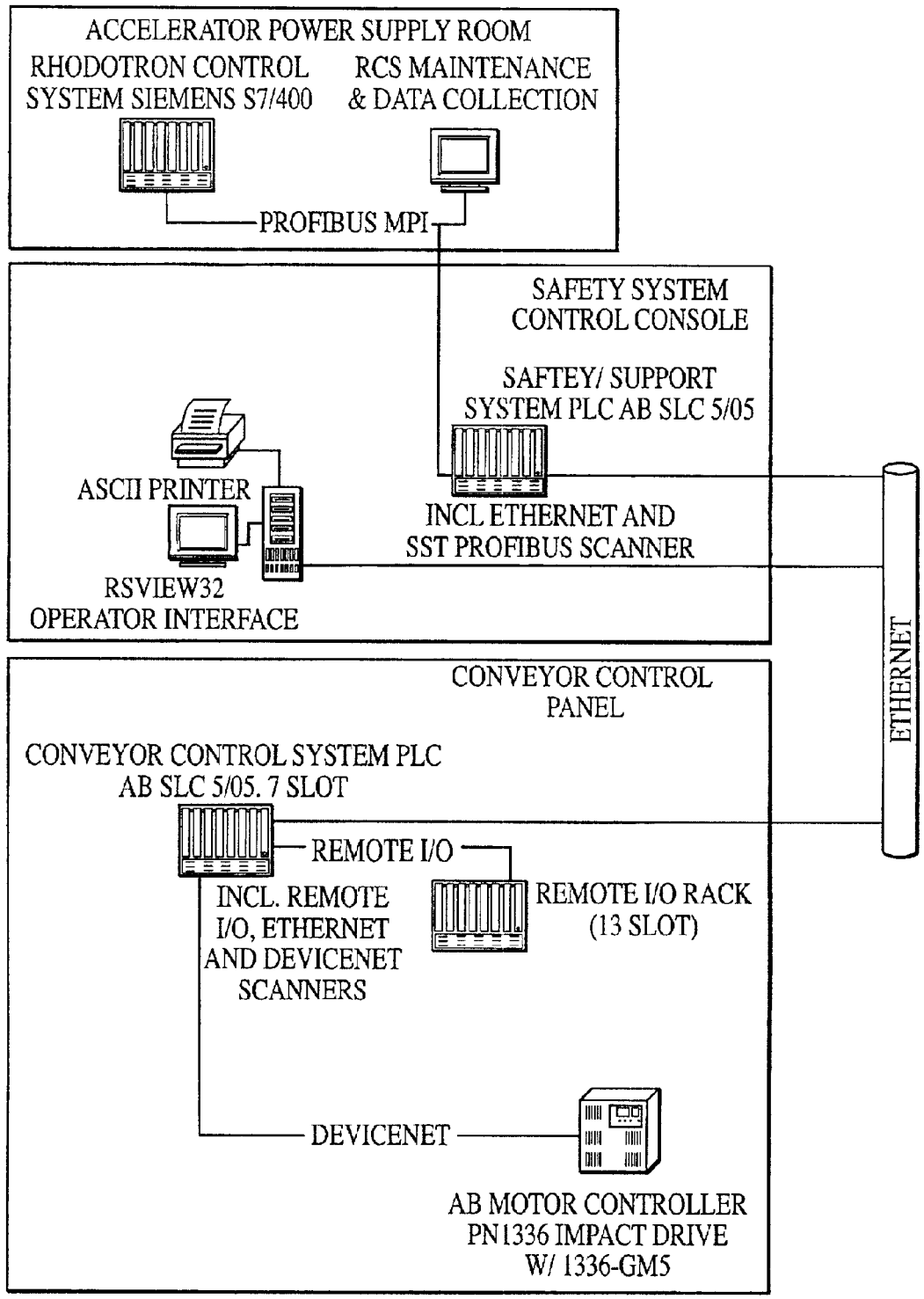
FIG. 3 is a network layout for a logic control for an irradiation facility such as the one illustrated in FIG. 1.

FIG. 3 is a network layout for a logic control for an irradiation facility such as the one illustrated in FIG. 1. In FIG. 3, parameters are entered into an operator interface terminal (OIT). Parameters that are entered include the particular beam selected, i.e., the 5 MeV x-ray beam, the 7 MeV x-ray beam, or the 10 MeV e-beam, as well as parameters critical to determining the dose delivered to a product being treated. Among the critical parameters for determining the dose delivered are the beam pass conveyor speed and beam current.

The parameters entered into the OIT are sent to two programmable logic control (PLC) devices, namely, a conveyor control system (CCS) and a safety/support system (SSS). There are two CCS units, one for each conveyor systems—i.e., one for the upper level conveyor system that services the 5 MeV and and 7 MeV x-ray beams and one for the lower level conveyor system that services the 10 MeV e-beam. Therefore, the OIT only sends the input parameters to the CCS that corresponds to the selected conveyor system. Preferably, the CCS and SSS devices are Allen-Bradley SLC 5/05 PLCs.

The CCS, in turn, sends the beam pass conveyor speed to the beam pass conveyor drive. Preferably, the drive is an Allen-Bradley 1136 Impact Adjustable Frequency AC Drive. The drive then commands the beam pass conveyor motor to run at the requested speed.

The drive also continually monitors electrical signals coming off the motor of the beam pass conveyor (i.e., induction, resistance, flux current and inertia) and infers from these signals the actual speed at which the motor is running. This information is fed back to the SSS device. The SSS device then calculates the beam current to be requested from the accelerator using the following calculation:

$$C_R = (S_A/S_S) * C_S$$

wherein "$C_R$" is the new beam current requested, "$S_A$" is the actual speed of the beam pass conveyor, "$S_S$" is the set speed of the beam pass conveyor, and "$C_S$" is the set beam current. From the calculation, it can be seen that beam current will follow the beam pass conveyor speed with a direct scaled relation.

When the SSS has calculated the beam current to be requested, it delivers the request to a Rhodotron PLC which controls the beam. The Rhodotron PLC operates the beam at the requested current. As the impact drive continually monitors the actual speed of the beam pass conveyor motor, the beam current requested is updated, thereby insuring near perfect coordination between the two parameters.

During startup and shutdown, the same calculation is used to correct beam delivery to the product. The conveyance system is designed to stop within one half (½) or less of the beam width (as measured in the direction of product travel through the beam). This minimizes transient dose during emergency shutdown and subsequent restarts.

Although preferred embodiments of the invention and their advantages have been described herein in detail, it should be understood that various changes, substitutions and alterations may be made without departing from the spirit and scope of the invention as defined by the appended claims and their equivalents.

What is claimed:

1. An irradiation system, comprising:
    an accelerator system that generates and directs a radiation beam with a current; and
    a beam pass conveyor that moves product through the radiation beam at a speed,
    wherein the current of the radiation beam and the speed of the beam pass conveyor are coordinated so that the current of the radiation beam changes in response to changes in the speed of the beam pass conveyor.

2. The irradiation system of claim 1 wherein the accelerator system is capable of executing changes in beam current faster than 0.1 seconds.

3. The irradiation system of claim 1, wherein accelerator system and beam pass conveyor are located inside a radiation cell and the speed of the beam pass conveyor is monitored by monitoring the speed of a motor for the beam pass conveyor.

4. The irradiation system of claim 3, wherein the speed of the motor is inferred using a variable frequency drive from changes in the induction, resistance, flux current and/or inertia of the motor.

5. The irradiation system of claim 4, wherein the variable frequency drive is located outside the radiation cell.

6. The irradiation system of claim 5, wherein the variable frequency drive is the only sensor used to monitor the speed of the beam pass conveyor.

7. An irradiation system, comprising:

a radiation cell;

a beam pass conveyor located within the radiation cell for moving product through a radiation beam;

a motor located inside the radiation cell for driving the beam pass conveyor; and a variable frequency drive located outside the radiation cell for controlling and monitoring the speed of the motor and, thereby, the speed of the beam pass conveyor, wherein the variable frequency drive is the only device that monitors the speed of beam pass conveyor.

8. The irradiation system of claim 7, wherein the radiation cell contains an accelerator for generating and directing a radiation beam that has a current, wherein the current of the radiation beam changes in response to changes in the speed of the beam pass conveyor.

9. The irradiation system of claim 7 wherein the accelerator is capable of executing changes in beam current faster than 0.1 seconds.

10. The irradiation system of claim 7 wherein the variable frequency drive infers the speed of the motor from changes in induction, resistance, flux current and/or inertia of the motor.

11. The irradiation system of claim 7, wherein the variable frequency drive is the only sensor used to monitor the speed of the beam pass conveyor.

12. A method for treating product in an irradiation system comprising the following steps:

(i) setting a speed for a beam pass conveyor and a current for a radiation beam;

(ii) moving product on the beam pass conveyor through the radiation beam;

(iii) monitoring the actual speed of the beam pass conveyor; and (iv) changing the current of the radiation beam in response to changes in the actual speed of the beam pass conveyor.

13. The method of claim 12, wherein the radiation beam is generated and directed by an accelerator that is capable of executing requested changes in beam current faster than 0.1 seconds.

14. The method of claim 12 wherein the speed of the beam pass conveyor is monitored by monitoring the speed of the motor that drives the beam pass conveyor.

15. The method of claim 12 wherein the speed of the motor that drives the beam pass conveyor is monitored using a variable frequency drive that infers the speed of the motor from changes in induction, resistance, flux current and/or inertia of the motor.

16. The method of claim 12 wherein the variable frequency drive is the only sensor used to monitor the speed of the beam pass conveyor.

17. An irradiation system comprising:

an accelerator system that generates and directs a radiation beam with a current;

a beam pass conveyor that moves product through the radiation beam at a speed, a rotation device located proximate to the beam pass conveyor that rotates product in front of the radiation beam, wherein beam current, beam pass conveyor speed, and the number and speed of rotation are coordinated in order to deliver a predetermined dose to the product.

18. A method for treating product in an irradiation system comprising the following steps:

(i) setting a speed for a beam pass conveyor, current for a radiation beam, and number and speed of rotation for a rotation device;

(ii) moving product on the beam pass conveyor through the radiation beam and rotating the product on the rotation device within the radiation beam; and (iii) monitoring the actual speed of the beam pass conveyor and/or the actual beam current of the radiation beam and/or the actual speed of rotation of the rotation device.

\* \* \* \* \*